United States Patent
Bae (10) Patent No.: US 9,601,946 B2
(45) Date of Patent: Mar. 21, 2017

(54) WIRELESS POWER TRANSMITTER, WIRELESS POWER RECEIVER AND WIRELESS POWER TRANSMISSION METHOD

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 356 days.

(21) Appl. No.: 13/712,643

(22) Filed: Dec. 12, 2012

(65) Prior Publication Data

US 2013/0154386 A1    Jun. 20, 2013

(30) Foreign Application Priority Data

Dec. 19, 2011    (KR) .................. 10-2011-0137786

(51) Int. Cl.
| | | |
|---|---|---|
| H01F 27/42 | (2006.01) | |
| H01F 37/00 | (2006.01) | |
| H01F 38/00 | (2006.01) | |
| H02J 17/00 | (2006.01) | |
| H02J 5/00 | (2016.01) | |

(52) U.S. Cl.
CPC .............. *H02J 17/00* (2013.01); *H02J 5/005* (2013.01)

(58) Field of Classification Search
CPC ........ H02J 17/00; H02J 17/005; H02J 77/025; H01F 38/14
USPC ......................................... 307/104; 320/108
See application file for complete search history.

(56) References Cited

U.S. PATENT DOCUMENTS

| | | | | |
|---|---|---|---|---|
| 2010/0026236 | A1* | 2/2010 | Kamiyama et al. | 320/108 |
| 2010/0176659 | A1* | 7/2010 | Aoyama | H02J 7/025 307/104 |
| 2010/0201316 | A1* | 8/2010 | Takada | B60L 11/182 320/108 |
| 2010/0315039 | A1* | 12/2010 | Terao | H02J 7/025 320/108 |
| 2011/0049995 | A1 | 3/2011 | Hashiguchi | |

(Continued)

FOREIGN PATENT DOCUMENTS

| | | |
|---|---|---|
| CN | 10-1520695 A | 9/2009 |
| CN | 10-2013736 A | 4/2011 |

(Continued)

OTHER PUBLICATIONS

European Search Report dated May 27, 2013 in European Application No. 12196146.0.

(Continued)

*Primary Examiner* — Rexford Barnie
*Assistant Examiner* — Rasem Mourad
(74) *Attorney, Agent, or Firm* — Saliwanchik, Lloyd & Eisenschenk (57) ABSTRACT

Disclosed is a wireless power transmitter for wirelessly transmitting a power to a wireless power receiver. The wireless power transmitter includes a transmitting unit for transmitting a power supplied from a power source to the wireless power receiver using resonance, and a detecting unit for measuring an input impedance seen to the transmitting unit at the power source to detect a variation of an output impedance of the wireless power receiver by using the measured input impedance.

22 Claims, 3 Drawing Sheets

(56) References Cited

U.S. PATENT DOCUMENTS

| | | | |
|---|---|---|---|
| 2011/0049997 A1* | 3/2011 | Urano | 307/104 |
| 2011/0065398 A1* | 3/2011 | Liu | H02J 5/005 |
| | | | 455/127.1 |
| 2011/0080051 A1 | 4/2011 | Lee et al. | |
| 2011/0109167 A1* | 5/2011 | Park et al. | 307/104 |
| 2011/0195666 A1* | 8/2011 | Forsell | A61B 5/0031 |
| | | | 455/41.2 |
| 2011/0210620 A1 | 9/2011 | Shinoda et al. | |
| 2011/0316348 A1 | 12/2011 | Kai et al. | |
| 2012/0056580 A1 | 3/2012 | Kai et al. | |
| 2012/0098348 A1 | 4/2012 | Inoue et al. | |

FOREIGN PATENT DOCUMENTS

| | | |
|---|---|---|
| CN | 102005827 A | 4/2011 |
| EP | 2216870 A2 | 8/2010 |
| EP | 2216878 A2 * | 8/2010 |
| EP | 2216878 A2 | 8/2010 |
| JP | 2009-106126 A | 5/2009 |
| JP | 2010-233442 A | 10/2010 |
| JP | 2010-252446 A | 11/2010 |
| JP | 2010-288431 A | 12/2010 |
| JP | 2010-288441 A | 12/2010 |
| KR | 10-2011-0037728 A | 4/2011 |
| TW | 2007-42224 | 11/2007 |
| WO | WO-2010-035546 A1 | 4/2010 |
| WO | WO-2011/148254 A2 | 12/2011 |

OTHER PUBLICATIONS

Office Action dated May 30, 2013 in Korean Application No. 10-2011-0137786, filed Dec. 19, 2011.
Office Action dated Oct. 29, 2013 in Japanese Application No. 2012-265975, filed Dec. 5, 2012.
Office Action dated Jul. 2, 2104 in Taiwanese Application No. 101146061.
Notice of Allowance dated Mar. 4, 2014, in Japanese Application No. 2012-265975.
Office Action dated Jul. 3, 2014 in Chinese Application No. 2012-10555002.8.
Maruyama et al., "Reverse link information transmission using load modulation in resonant wireless transmission," *IEICE Communications Society*, Sep. 14, 2010, pp. 1-4.
Office Action dated Oct. 29, 2013 in Japanese Application No. 2012-265975.
Office Action dated Nov. 28, 2016 in Chinese Application No. 201510260672.0.

* cited by examiner

WIRELESS POWER TRANSMITTER, WIRELESS POWER RECEIVER AND WIRELESS POWER TRANSMISSION METHOD

CROSS-REFERENCE TO RELATED APPLICATION

This application claims the benefit under 35 U.S.C. §119 of Korean Patent Application No. 10-2011-0137786, filed Dec. 19, 2011, which is hereby incorporated by reference in its entirety.

BACKGROUND

The embodiment relates to a wireless power transmitter, a wireless power receiver and a wireless power transmission method.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme using resonance has been widely used.

Since an electric signal generated between the wireless power transmitter and the wireless power receiver is wirelessly transferred through coils in a wireless power transmitting scheme using resonance, a user may easily charge electronic appliances such as a portable device.

In addition, the wireless power transmitter may receive information about a state of a wireless power receiver to transmit power. A load modulation technique is used for data transmission since high cost is required if an additional communication channel or an additional communication unit is provided for the data transmission from the wireless power receiver to the wireless power transmitter. The load modulation technique is a scheme that senses a variation of input impedance of a wireless power transmitter party when a load (impedance) of the wireless power receiver is changed.

However, an application of the load modulation technique is limited to a magnetic induction type wireless power transmission system.

BRIEF SUMMARY

An embodiment provides a wireless power transmitter, a wireless power receiver and a wireless power transmission method, which can obtain information about a wireless power receiver by detecting a phase of an input impedance.

According to an embodiment, there is provided a wireless power transmitter for wirelessly transmitting a power to a wireless power receiver. The wireless power transmitter includes: a transmitting unit for transmitting a power supplied from a power source to the wireless power receiver using resonance; and a detecting unit for measuring an input impedance seen to the transmitting unit at the power source to detect a variation of an output impedance of the wireless power receiver by using the measured input impedance.

According to an embodiment, there is provided a wireless power receiver for receiving a power from a wireless power transmitter. The wireless power receiver includes: an impedance varying unit for varying an output impedance of the wireless power receiver to vary an input impedance of the wireless power transmitter; a receiving unit for receiving a power according to a variation of the output impedance from the wireless power transmitter using resonance.

According to an embodiment, there is provided a method for transmitting a power in a wireless power system which includes a wireless power transmitter and a wireless power receiver for wirelessly receiving the power from the wireless power transmitter. The method includes the steps of: varying an output impedance of the wireless power receiver; detecting an input impedance of the wireless power transmitter according to a variation of the output impedance; and detecting the variation of the output impedance based on the input impedance.

According to the embodiments, information about the state of the wireless power receiver can be obtained based on the input impedance which is varied as the output impedance is changed and the power transmission can be performed according to the information, so that any additional communication units or channels are not necessary.

Thus, since there is no need to pay additional cost when the wireless power transmission system is constructed, the system can be easily implemented.

Meanwhile, any other various effects will be directly and implicitly described below in the description of the embodiment.

DETAILED DESCRIPTION

Hereinafter, the embodiments will be described with reference to accompanying drawings in detail so that those skilled in the art can easily realize the embodiments.

Figure 1:
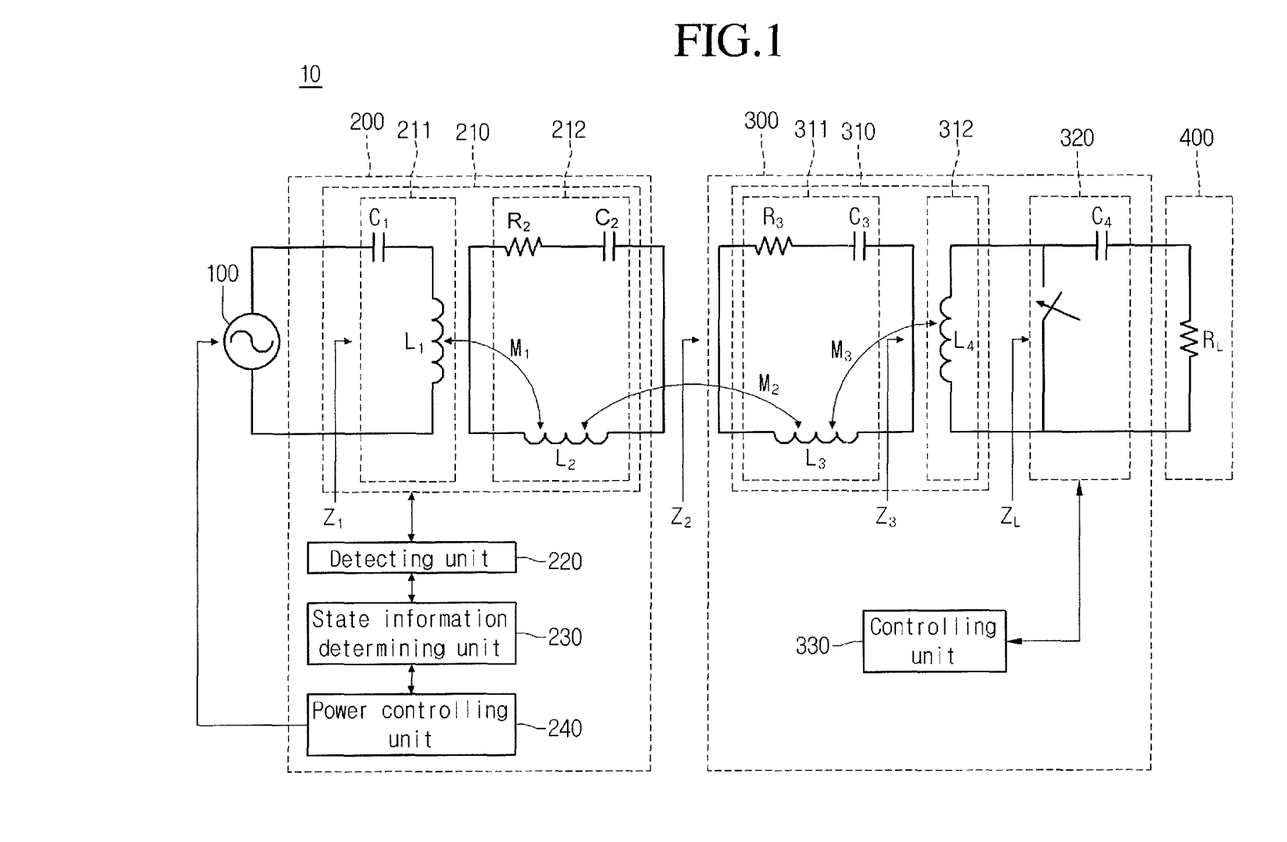
FIG. 1 is a circuit diagram showing a wireless power transmission system according to an embodiment.

FIG. 1 a circuit diagram showing a wireless power transmission system 10 according to the embodiment.

Referring to FIG. 1, the wireless power transmission system may include a power source 100, a wireless power transmitter 200, a wireless power receiver 300 and a load side 400.

The wireless power transmitter 200 may include a transmitting unit 210, a detecting unit 220, a state information determining unit 230 and a power controlling unit 240.

The transmitting unit 210 may include a transmission induction coil unit 211 and a transmission resonance coil unit 212.

The wireless power receiver 300 includes a receiving unit 310, an impedance varying unit 320 and a controlling unit 330.

The receiving unit 310 includes a reception resonance coil unit 311, a reception induction coil unit 312, and an impedance varying unit 320. The power generated from the power source 100 may be transferred to the wireless power transmitter 200, and the wireless power transmitter 200 may transmit the power to the wireless power receiver 300 using resonance. The power transmitted to the wireless power receiver 300 is transferred to the load side 400 through a rectifier circuit (not shown).

The load side 400 may be a battery or a predetermined apparatus which needs power, and a load impedance is denoted as 'RL' in the embodiment. In the embodiment, the load side 400 may be included in the wireless power receiver 300.

In more detail, the power source 100 is an AC power source for supplying an AC power having a predetermined frequency.

The transmitting unit 210 may include the transmission induction coil unit 211 and the transmission resonance coil unit 212. The transmission induction coil unit 211 is connected to the power source 100, and the AC current flows through the transmission induction coil unit 211. When the AC current flows through the transmission induction coil unit 211, an AC current is induced in the transmission resonance coil unit 212 physically spaced apart from the transmission coil 21 due to electromagnetic induction. The power transferred to the transmission resonance coil 212 is transmitted using resonance to the wireless power receiver 300 which forms a resonance circuit with the wireless power transmitter 200.

Power may be transferred using resonance between two LC circuits which are impedance-matched with each other. The power transfer using resonance is able to transfer power at higher efficiency to a longer distance than those by electromagnetic induction.

In detail, the transmission resonance coil unit 212 of the wireless power transmitter 200 may transmit power to the reception resonance coil unit 311 of the wireless power receiver 300 through a magnetic field.

The transmission resonance coil unit 212 and the reception resonance coil unit 311 are resonance-coupled with each other to operate at the resonance frequency By using the resonance couple between the transmission resonance coil unit 212 and the reception resonance coil unit 311, power transmission efficiency between the transmission resonance coil unit 212 and the reception resonance coil unit 311 may be further improved.

The transmission resonance coil unit 212 includes a transmission induction coil L1 and a capacitor C1. A capacitance of the capacitor C1 may have a fixed value.

One terminal of the capacitor C1 is connected to one terminal of the power source 100, and the other terminal of the capacitor C1 is connected to one terminal of the transmission induction coil L1. The other terminal of the transmission induction coil L1 is connected to the other terminal of the power source 100.

The transmission resonance coil unit 212 includes a transmission resonance coil L2, a capacitor C2, and a resistor R2. The transmission resonance coil L2 includes one terminal connected to one terminal of the capacitor C2 and the other terminal connected to one terminal of the resistor R2. The other terminal of the resistor R2 is connected to the other terminal of the capacitor C2. A resistance of the resistor R denotes an amount of power loss of the transmission resonance coil L2.

The detecting unit 220 may measure the first input impedance Z1 which is an impedance seen to the wireless power transmitter 200 at the power source 100 toward. In the embodiment, when an input voltage, which is input to the wireless power transmitter 200, is known, the detecting unit 220 may measure an input current input to the wireless power transmitter 200 to measure the first input impedance Z1.

The detecting unit 220 may detect a phase of the first input impedance Z1 based on the first input impedance Z1. The phase of the first input impedance Z1 signifies a phase difference between the input voltage and the input current output from the power source 100.

The detecting unit 220 detects a variation of an output impedance ZL by the impedance varying unit 320 of the wireless power receiver 300, which will be described below, by using the detected phase difference.

The detecting unit 220 may detect a phase of 0 degree or 90 degrees according to the operation of the impedance varying unit 320 which will be described below.

The detecting unit 220 may recognize the state of the wireless power receiver 300, that is, the state whether the switch SW of the impedance varying unit 320 is open or shorted, through the phase detection.

The state information determining unit 230 determines the state information of the wireless power receiver 300 according to the first input impedance. In the embodiment, the state information about the wireless power receiver 300 may include information about a charged amount or a change of the charged amount of the wireless power receiver 300. Further, the state information about the wireless power receiver 300 may include charging completion information informing that charging of the wireless power receiver 300 has been completed.

The power controlling unit 240 controls the power transferred to the wireless power receiver 300 according to the state information. The power controlling unit 240 controls the power source 100 to control the power transferred to the wireless power transmitter 200, so that the power transferred to the wireless power receiver 300 can be controlled.

Therefore, the phase detecting procedure may signify a procedure of determining the state of the wireless power receiver 300 by the wireless power transmitter 200. That is, the wireless power receiver 300 transmits the state information thereof to the wireless power transmitter 200, and the wireless power transmitter 200 transmits the suitable power according to the received state information about the wireless power receiver 300.

The wireless power transmitter 200 may recognize the information about a present charge amount of the wireless power receiver 300 by detecting a phase of the first input impedance Z1, and may perform power transmission corresponding to the recognized information. For example, when it is determined that the present charge amount of the wireless power receiver 300 is insufficient, the wireless power transmitter 200 may control the amount of output power from the power source 100 to increase the transmitting power.

For example, when it is determined that the power has been charged in the wireless power receiver 300, the wireless power transmitter 200 may control the output of the power source 100 such that the power transmission may be stopped.

The wireless power receiver 300 may include a receiving unit 310 and an impedance varying unit 320.

The receiving unit 310 includes a reception resonance coil unit 311 and a reception induction coil unit 312.

The reception resonance coil unit 311 includes a reception resonance coil L3, a capacitor C3, and a resistor R3. The reception resonance coil L3 includes one terminal connected to one terminal of the capacitor C3 and the other terminal connected to one terminal of the resistor R3. The other terminal of the resistor R3 is connected to the other terminal of the capacitor C2. A resistance of the resistor R3 denotes an amount of lost power caused due to a power loss of the reception resonance coil L3.

The reception induction coil unit 312 includes a reception induction coil L4 which has both terminals connected to both terminals of the impedance varying unit 320. The reception induction coil L4 may further include a capacitor (not shown), so that a circuit having suitable inductance and capacitance values can be formed.

The reception resonance coil unit 311 maintains the resonance state with the transmission resonance coil unit 212 at the resonance frequency. That is, the reception resonance coil unit 311 is resonance-coupled with the transmission resonance coil unit 212 such that an AC current flows therethrough, and the wireless power receiver 300 may receive power in a non-radiative scheme.

The reception induction coil unit 312 receives power from the reception resonance coil unit 312 by electromagnetic induction, and the power received at the reception induction coil unit 312 is transferred to the load side 400 after the power is rectified by the rectifier circuit (not shown) through the impedance varying unit 320.

The impedance varying unit 320 may include a switch SW and a capacitor C4. The switch SW includes one terminal connected to one terminal of the capacitor C4 and the other terminal connected to one terminal of the load side 400. The other terminal of the load side 400 is connected to the other terminal of the capacitor C4.

The impedance varying unit 320 may vary an output impedance ZL seen from the reception induction coil L4 to the load side 400. The impedance varying unit 320 may vary the output impedance through the switch SW such that the first input impedance Z1 may be varied.

Hereinafter, the procedure of varying the first input impedance Z1 through the impedance varying unit 320 will be described.

The third input impedance Z3 signifies a measured impedance seen to the load side 400 at the reception resonance coil L3 and may expressed as Equation 1:

$$Z_3 = \frac{\omega^2 M_3^2}{Z_1 + j\omega L_4} \quad \text{[Equation 1]}$$

wherein 'w' denotes a resonance frequency between the transmission resonance coil L2 and the reception resonance coil L3, and 'M3' is a mutual inductance between the reception resonance coil L3 and the reception induction coil L4. Further, 'ZL' denotes an output impedance. Equation 1 is based on the frequency domain and equations which will be described below are also based on the frequency domain.

The second input impedance Z2 signifies a measured impedance seen to the wireless power receiver 300 at the wireless power transmitter 200 and may be expressed as Equation 2:

$$Z_2 = \frac{j\omega^3 C_3 M_2^2}{1 - \omega^2 L_3 C_3 + j\omega C_3 (Z_3 + R_3)} \quad \text{[Equation 2]}$$

wherein 'M2' denotes a mutual inductance between the transmission resonance coil L2 and the reception resonance coil L3, and 'C3' denotes a capacitor which is an equivalent circuit corresponding to the reception resonance coil unit 311. Further, 'R3' denotes a resistance corresponding to an amount of power loss caused by power loss of the reception resonance coil L3.

Although the capacitor C3 and the leakage resistor R3 have fixed values, the mutual inductance M2 may vary according to a coupling factor K2 between the transmission resonance coil L2 and the reception resonance coil L3.

The coupling factor K2 denotes a degree of the electromagnetic coupling between the transmission resonance coil L2 and the reception resonance coil L3, and may vary by at least one of a distance, a direction and a position between the wireless power transmitter 200 and the wireless power receiver 300.

The first input impedance Z1 is an impedance measured when seeing the wireless power transmitter 200 at the power source 100 and may be expressed as Equation 3:

$$Z_1 = j\omega L_1 + \frac{1}{j\omega C_1} + \frac{j\omega^3 C_2 M_1^2}{1 - \omega^2 L_2 C_2 + j\omega C_2 (Z_2 + R_2)} \quad \text{[Equation 3]}$$

wherein 'M1' denotes a mutual inductance between the transmission induction coil L1 and the transmission resonance coil L2.

If it is assumed that R1 and R2 have very small values, R1 and R2 may become '0' (zero). In addition, if the first input impedance Z1 is selected such that resonances between the transmission induction coil L1 and the capacitor C1, between the transmission resonance coil L2 and the capacitor C2, and between the reception resonance coil L3 and the capacitor C3 occur at the same resonance frequency w, the first input impedance Z1 may be expressed as Equation 4:

$$Z_1 = \frac{M_1^2 M_3^2}{M_2^2} \frac{\omega^2}{Z_1 + j\omega L_4} \quad \text{[Equation 4]}$$

Further, if following Equation 5 and Equation 7 are applied to Equation 4, Equation 4 may be expressed as Equation 8:

$$M_1 = k_1 \sqrt{L_1 L_2} \quad \text{[Equation 5]}$$

$$M_2 = k_2 \sqrt{L_2 L_3} \quad \text{[Equation 6]}$$

$$M_3 = k_3 \sqrt{L_3 L_4} \quad \text{[Equation 7]}$$

$$Z_1 = \frac{k_1^2 k_3^2}{k_2^2} \frac{\omega^2 L_1 L_4}{Z_1 + j\omega L_4} \quad \text{[Equation 8]}$$

Referring to Equation 8, as the output impedance ZL varies, the first input impedance Z1 may vary. This procedure will be described in detail with reference to FIGS. 2 and 3.

The controlling unit 330 applies a control signal to the impedance varying unit 320 such that the impedance varying unit 320 is controlled. The control signal may include a driving signal for allowing the switch SW to be open or shorted.

Hereinafter, the variations of the output impedance ZL and the first input impedance Z1 according to whether the switch SW is open or shorted will be described with reference to FIGS. 2 and 3.

Figure 2:
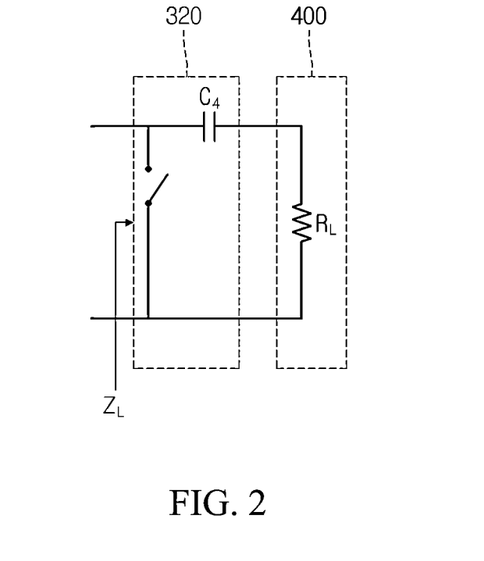
FIG. 2 is a circuit diagram showing a state that a switch of an impedance varying unit is open according to an embodiment.

FIG. 2 illustrates that the switch SW of the impedance varying unit 320 is open according to the embodiment.

When the switch SW is open by the control signal of the controlling unit 330, the impedance varying unit 320 may be expressed as a circuit diagram depicted in FIG. 2.

At this time, the output impedance ZL may be expressed as Equation 9:

$$Z_1 = R_1 + \frac{1}{j\omega C_4} \quad \text{[Equation 9]}$$

If the values of the reception induction coil L4 and the capacitor C4 are selected to allow the reception induction coil L4 and the capacitor C4 to resonate with each other at the resonance frequency w, the first input impedance Z1 of Equation 8 is expressed as Equation 10:

$$Z_1 = \frac{k_1^2 k_3^2}{k_2^2} \frac{\omega^2 L_1 L_4}{R_1} \quad \text{[Equation 10]}$$

In this case, the first input impedance Z1 has only a real component. As the first input impedance Z1 has only a real component, a phase difference between the input voltage and the input current input from the power source 100 does not exist. That is, a phase difference between the input voltage and the input current input from the wireless power transmitter 200 is equal to 0 (zero), and thus, the phase of the first input impedance Z1 is equal to 0 (zero).

Figure 3:
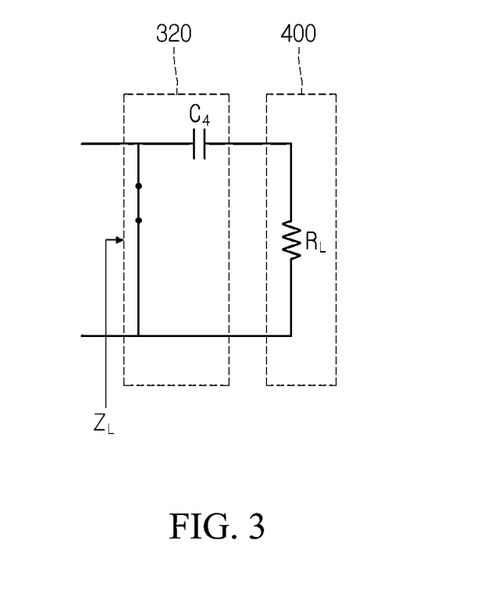
FIG. 3 is a circuit diagram showing a state that a switch of an impedance varying unit is shorted according to an embodiment.

FIG. 3 illustrates that the switch SW of the impedance varying unit 320 is shorted.

When the switch SW is shorted by the control signal of the controlling unit 330, the impedance varying unit 320 may be expressed as a circuit diagram depicted in FIG. 3.

In this case, the output impedance ZL may be expressed as Equation 11:

$$Z_L = 0 \quad \text{[Equation 11]}$$

If the reception induction coil L4 and the capacitor C4 are selected to resonate with each other at the resonance frequency w, the first input impedance Z1 of Equation 8 may be expressed as Equation 12:

$$Z_1 = \frac{k_1^2 k_3^2}{k_2^2}(-j\omega L_1) \quad \text{[Equation 12]}$$

In this case, the first input impedance Z1 has only an imaginary component. As the first input impedance Z1 has only an imaginary component, a phase difference between the input voltage and the input current input from the power source 100 is equal to 90 degrees. That is, the phase difference between the input voltage and the input current input from the wireless power transmitter 200 is equal to 90 degrees, and thus, the phase of the first input impedance Z1 is equal to 90 degrees (or −90 degrees).

As described above, the output impedance varies according to the switching operation of the wireless power receiver 300 and the wireless power transmitter 200 detects the phase difference (or the phase of the first input impedance) between the input voltage and the input current, so that the wireless power transmitter 200 may recognize the state of the wireless power receiver 300, that is, whether the switch is open or shorted. Thus, the wireless power transmitter 200 may perform a suitable power transmitting procedure by recognizing the state of the wireless power receiver 300.

For example, when digital data '1' is to be transmitted from the wireless power receiver 300, the controlling unit 330 allows the switch SW to be shorted, and when digital data '1' is to be transmitted, the controlling unit 330 allows the switch SW to be open. The detecting unit 220 may detect whether the switch SW is open or shorted and may receive the state information about the wireless power receiver 300. Thus, the wireless power transmitter 200 may receive the state information about the wireless power receiver 300 to perform suitable power transmission.

Figure 4:
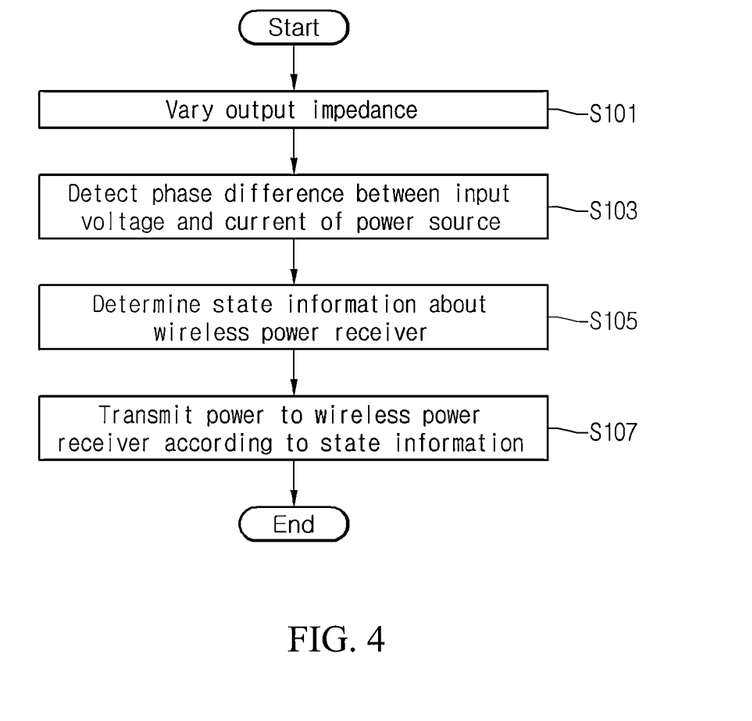
FIG. 4 is a flowchart illustrating a wireless power transmission method of a wireless power transmission system according to an embodiment.

FIG. 4 is a flowchart illustrating a wireless power transmission method according to the embodiment.

Hereinafter, the wireless power transmission method according to the embodiment will be described in cooperation with description of FIGS. 1 to 3.

The configuration of the wireless power transmission system 10 is the same as that depicted in FIG. 1.

First, in step S101, the impedance varying unit 320 of the wireless power receiver 300 varies the output impedance. As shown in FIG. 1, the output impedance ZL signifies the measured impedance seen to the impedance varying unit 320 at the receiving unit 310. The impedance varying unit 320 may include the switch SW and capacitor C4, and may vary the output impedance by using the switch SW. For example, when the wireless power receiver 300 determines that the current charged amount is insufficient, the wireless power receiver 300 may vary the output impedance to receive increased power from the wireless power transmitter 200. The output impedance may vary by the switching operation as shown in FIGS. 2 and 3.

In step S103, the detecting unit 220 of the wireless power transmitter 200 may detect the phase difference between the input voltage and input current output from power source 100 to the wireless power transmitter 200 according to the output impedance variation. That is, the detecting unit 200 may detect the phase difference between the input voltage and the input current input to the wireless power transmitter 200 based on the first input impedance which is varied according to the variation of the output impedance.

The detecting unit 220 may detect the variation of the output impedance of the wireless power receiver 200 through the detected phase difference.

The phase difference may have either 0 degree or 90 degrees. The detection of the phase difference may be achieved based on the first input impedance seen to the transmitting unit 210 at the power source 100, as described in detail with reference to FIGS. 2 and 3.

In step S105, the state information determining unit 230 of the wireless power transmitter 200 may determine the state information about the wireless power receiver 300 based on the phase difference. In the embodiment, the wireless power transmitter 200 may determine the state information about the wireless power receiver 300 based on the variation of the phase difference for a predetermined time.

Thereafter, in step S107, the power controlling unit 240 may control the power source 100 according the state information about the wireless power receiver 300 to transmit power to the wireless power receiver 300. For example, when the state information about the wireless power receiver 300 may include the charge completion information informing of the completion of the charge operation, the power controlling unit 240 of the wireless power receiver 300 may control the power source 100 such that the power transmission to the wireless power receiver 300 may be stopped.

As described above, according to the embodiment, the wireless power transmitter 200 detects the output impedance of the wireless power receiver 300 to identify the state information about the wireless power receiver 300, and may transmit power according to the state information, so that power can be effectively transmitted without any additional communication channels or communication units.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmitter for wirelessly transmitting a power to a wireless power receiver through a resonance frequency band being a resonance-coupled frequency between the wireless power transmitter and the wireless power receiver, the wireless power transmitter comprising:
    a transmitting unit configured to transmit a power supplied from a power source to the wireless power receiver through the resonance frequency band;
    a detecting unit configured to measure an input impedance seen by the power source, and to detect a phase difference of the input impedance to obtain a state information of the wireless power receiver while transmitting the power; and
    a power controlling unit configured to control the transmitting unit based on the state information in order to control an amount of the power transmitted to the wireless power receiver;
    wherein the state information is created according to an output impedance of the wireless power receiver;
    wherein the transmitting unit transmits an adjusted power based on the state information;
    wherein the phase difference of the input impedance corresponds to a variation of the output impedance of the wireless power receiver;
    wherein the wireless power transmitter recognizes information about a present charge amount of the wireless power receiver based on the phase difference, and adjusts the power corresponding to the recognized information about the present charge amount of the wireless power receiver;
    wherein the phase difference in the input impedance of the wireless power transmitter is induced by the output impedance of the wireless power receiver;
    wherein the state information is determined based on the phase difference of the input impedance of the wireless power transmitter; and
    wherein the input impedance and the output impedance are expressed by the equation $$Z_1 = \frac{k_1^2 k_3^2}{k_2^2} \frac{\omega^2 L_1 L_4}{Z_L + j\omega L_4},$$

where $Z_1$ denotes the input impedance, $Z_L$ denotes the output impedance, $L_1$ denotes a transmission coil inductance, and $L_4$ denotes a reception coil inductance.

2. The wireless power transmitter of claim 1, wherein the phase difference of the input impedance is determined using a phase difference between an input voltage and an input current of the wireless power transmitter by using the measured input impedance.

3. The wireless power transmitter of claim 2, wherein the phase difference of the input impedance is determined according to a state of a switch of the wireless power receiver.

4. The wireless power transmitter of claim 3, wherein the phase difference has a value of 0 degrees or 90 degrees.

5. The wireless power transmitter of claim 1, wherein the transmitting unit comprises:
    a transmission induction coil configured to receive the power from the power source and
    a transmission resonance coil configured to transfer the power received from the transmission induction coil through electromagnetic induction to the wireless power receiver using resonance.

6. The wireless power transmitter of claim 3, wherein the phase difference of the input impedance has a value of 0 or 1.

7. A wireless power receiver for receiving a power from a wireless power transmitter, the wireless power receiver comprising:
    a switch for varying an output impedance of the wireless power receiver to communicate state information about the wireless power receiver to the wireless power transmitter while receiving the power; and
    a receiving unit configured to receive a power according to the state information from the wireless power transmitter using resonance;
    wherein the switch modulates a phase difference of an input impedance of the wireless power transmitter;
    wherein the state information is determined according to a state of the switch;
    wherein the switch is connected in parallel to the receiving unit;
    wherein the phase difference of the input impedance corresponds to a variation of the output impedance of the wireless power receiver;
    wherein the phase difference represents information about a present charge amount of the wireless power receiver;
    wherein the phase difference in the input impedance of the wireless power transmitter is induced by the output impedance of the wireless power receiver;
    wherein the state information is determined based on the phase difference of the input impedance of the wireless power transmitter; and
    wherein the input impedance and the output impedance are expressed by the equation $$Z_1 = \frac{k_1^2 k_3^2}{k_2^2} \frac{\omega^2 L_1 L_4}{Z_L + j\omega L_4},$$

where $Z_1$ denotes the input impedance, $Z_L$ denotes the output impedance, $L_1$ denotes a transmission coil inductance, and $L_4$ denotes a reception coil inductance.

8. The wireless power receiver of claim 7, wherein the output impedance is an impedance seen by the receiving unit.

9. The wireless power receiver of claim 7, further comprising
a capacitor connected to the switch,
wherein the output impedance is varied by shorting or opening the switch.

10. The wireless power receiver of claim 7, wherein the receiving unit comprises:
a reception resonance coil configured to receive the power from the wireless power transmitter using resonance; and
a reception induction coil configured to receive a power from the reception resonance coil through electromagnetic induction.

11. The wireless power receiver of claim 7, wherein the state information about the wireless power receiver includes the information about the present charge amount of the wireless power receiver.

12. A method for transmitting a power in a wireless power system which includes a wireless power transmitter and a wireless power receiver for wirelessly receiving the power from the wireless power transmitter, the method comprising:
varying an output impedance of the wireless power receiver;
detecting a phase difference of an input impedance of the wireless power transmitter according to a variation of the output impedance;
detecting state information of the wireless power receiver based on the phase difference; and
transmitting the power to the wireless power receiver using resonance according to the state information;
wherein the power is regulated based on the state information;
wherein the phase difference of the input impedance corresponds to a variation of the output impedance of the wireless power receiver;
wherein the wireless power transmitter recognizes information about a present charge amount of the wireless power receiver based on the base difference, and adjusts the power corresponding to the recognized information about the present charge amount of the wireless power receiver;
wherein the phase difference in the input impedance of the wireless power transmitter is induced by the output impedance of the wireless power receiver;
wherein the state information is determined based on the phase difference of the input impedance of the wireless power transmitter; and
wherein the input impedance and the output impedance are expressed by the equation $$Z_1 = \frac{k_1^2 k_3^2}{k_2^2} \frac{\omega^2 L_1 L_4}{Z_L + j\omega L_4},$$

where $Z_1$ denotes the input impedance, $Z_L$ denotes the output impedance, $L_1$ denotes a transmission coil inductance, and $L_4$ denotes a reception coil inductance.

13. The method of claim 12, wherein the phase difference of the input impedance is determined using a phase difference between an input voltage and an output voltage of the wireless power transmitter.

14. The method of claim 12, wherein the output impedance is varied by using a switch and a capacitor included in the wireless power receiver.

15. The method of claim 12, wherein the state information includes at least one of a first information or a second information,
wherein the first information is information about a change of the charged amount of the wireless power receiver, and
wherein the second information is information about completion of charge information of charge completion of the wireless power receiver.

16. The method of claim 12, wherein the phase differences of the input impedance has a value of 0 degrees or 90 degrees.

17. The wireless power receiver of claim 7, wherein the state information about the power receiver includes at least one of a first information or a second information,
wherein the first information is information about completion of charge informing of charge completion, and
wherein the second information is information about a change of the charged amount of the wireless power receiver.

18. The wireless power receiver of claim 7, wherein the phase difference of the input impedance has a value of 0 degrees or 90 degrees.

19. The wireless power transmitter of claim 1, wherein the state information includes information about the present charge amount of the wireless power receiver.

20. The wireless power transmitter of claim 1, wherein the state information includes information about completion of charge informing of charge completion of the wireless power receiver.

21. The wireless power transmitter of claim 1, wherein the state information includes information about a change of the charged amount of the wireless power receiver.

22. The wireless power transmitter of claim 1, further comprising a state information determining unit configured to determine the state information about the wireless power receiver based on a phase difference received from the detecting unit;
wherein the power controlling unit receives the state information from the state information determining unit.

* * * * *